US011999122B2

(12) United States Patent
Hanyu et al.

(10) Patent No.: US 11,999,122 B2
(45) Date of Patent: Jun. 4, 2024

(54) PRESS DEVICE AND PRESS METHOD

(71) Applicant: BEAC CO., LTD., Nagano (JP)

(72) Inventors: Shinichi Hanyu, Nagano (JP); Kazuhiko Kato, Nagano (JP)

(73) Assignee: BEAC CO., LTD., Nagano (JP)

( * ) Notice: Subject to any disclaimer, the term of this patent is extended or adjusted under 35 U.S.C. 154(b) by 397 days.

(21) Appl. No.: 17/614,555

(22) PCT Filed: Oct. 26, 2020

(86) PCT No.: PCT/JP2020/040081

§ 371 (c)(1),
(2) Date: Nov. 29, 2021

(87) PCT Pub. No.: WO2021/124682

PCT Pub. Date: Jun. 24, 2021

(65) Prior Publication Data

US 2022/0227088 A1 Jul. 21, 2022

(30) Foreign Application Priority Data

Dec. 19, 2019 (JP) ................................ 2019-228857
May 20, 2020 (JP) ................................ 2020-088323

(51) Int. Cl.
*B30B 1/32* (2006.01)
*B30B 5/02* (2006.01)
*B30B 15/00* (2006.01)

(52) U.S. Cl.
CPC .................. *B30B 1/32* (2013.01); *B30B 5/02* (2013.01); *B30B 15/0052* (2013.01)

(58) Field of Classification Search
CPC .......... B30B 1/32; B30B 5/02; B30B 15/0052
See application file for complete search history.

(56) References Cited

U.S. PATENT DOCUMENTS

2015/0360275 A1* 12/2015 Avrillaud ............... B21D 22/02
72/56

FOREIGN PATENT DOCUMENTS

| | | | |
|---|---|---|---|
| JP | H551616 U | 7/1993 | |
| WO | 2013035759 A1 | 3/2013 | |

OTHER PUBLICATIONS

International Search Report in PCT/JP2020/040081, dated Dec. 8, 2020. 5pp.

* cited by examiner

*Primary Examiner* — Xiao S Zhao
*Assistant Examiner* — Nicholas J Chidiac
(74) *Attorney, Agent, or Firm* — HAUPTMAN HAM, LLP

(57) ABSTRACT

A press device includes: a press head having: a press plate, a chamber base body and an elastic packing; and a provisional pressing unit having: a provisional pressing plate which transmits a provisional pressing force, and a provisional pressing force applying mechanism which gives a provisional pressing force to the provisional pressing plate. A main pressing force is generated to a work placed on a press surface by introducing a pressurized fluid into a chamber from a pressurized fluid source in a state where the elastic packing is deformed by compression by a provisional pressing force. The press device further includes a suppression unit which restricts the displacement of the provisional pressing plate in a counter provisional pressing direction by suppressing the movement of the provisional pressing plate in the counter provisional pressing direction.

15 Claims, 8 Drawing Sheets

FIG.1A
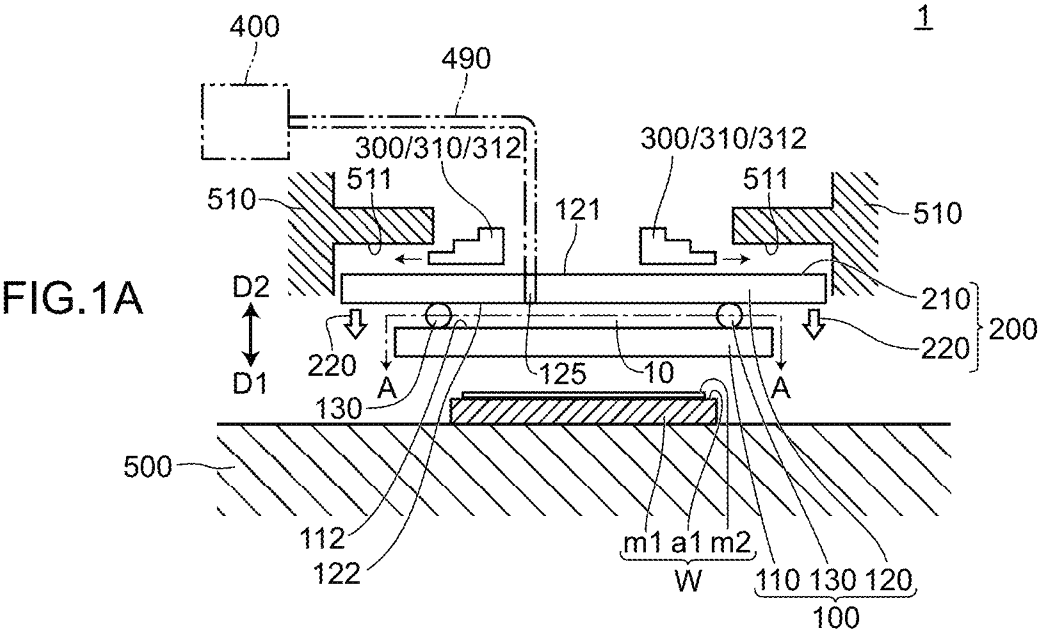
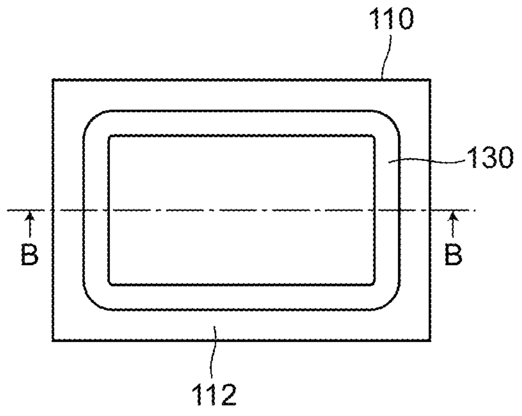
FIG.1B

PRESS DEVICE AND PRESS METHOD

RELATED APPLICATIONS

The present application is a National Phase of International Application No. PCT/JP2020/040081 filed Oct. 26, 2020, which claims priority to Japanese Application Nos. 2019-228857, filed Dec. 19, 2019, and 2020-088323, filed May 20, 2020.

TECHNICAL FIELD

The present invention relates to a press device and a press method.

BACKGROUND ART

Conventionally, there has been known a press device capable of pressing a work which is an object to be pressed. Patent literature 1 discloses a forming mold which is used as a press device. FIG. 8A is a cross-sectional view for describing a forming mold (conventional press device 800) described in patent literature 1.

As shown in FIG. 8A, the conventional press device 800 includes: a pressure chamber 805 which is formed in a body 801*a* of an upper mold 801 in a state where the pressure chamber 805 opens downward; and a through hole 806 which is formed in the body 801*a* and through which an upper surface of the body 801*a* communicates with the pressure chamber 805. A pusher 803 is disposed in the pressure chamber 805 in a vertically movable manner, and a piston 802 is disposed in the through hole 6 in a vertically movable manner. A pressure transmission medium 804 which is a non-compressive fluid is sealed in a space (sealed space 810) disposed between the piston 802 and the pusher 803. At the time of fastening the molds, a load is applied to the piston 802 by a press upper heat disc 809, and the load is applied to the pusher 803 via the pressure transmission medium 804. A work 815 is pressed by making use of this load.

The pressure transmission medium 804 is sealed in the sealed space 810 and hence, a volume of the pressure transmission medium 804 is basically fixed. Further, a function of the pressure transmission medium 804 is a function as a simple "intervening material" for transmitting a force for displacing (stroking) the pusher 803 in a direction toward a lower mold 807.

In the conventional press device 800, the pressure transmission medium 804 is a fluid and hence, a load applied by the piston 802 is transmitted to an entire upper surface of the pusher 803 in a uniformly distributed manner. Accordingly, a state of a face pressure obtained on a press surface 811 of the pusher 803 can be made uniform.

Patent literature 2 discloses an imprinting device as a press device. FIG. 8B is a cross-sectional view for describing the imprinting device described in patent literature 2 (another conventional press device 900).

As shown in FIG. 8B, in another conventional press device 900, a pressurization chamber 930 (chamber) is formed by a pressurization chamber housing 933, a rigid member 911, and a seal member 912 which engages with a recessed portion formed in the pressurization chamber housing 933 and the rigid member 911.

In another conventional press device 900, a mold 901 and an object to be formed (also referred to as a work) 902 are sandwiched by the rigid member 911 and a pressure receiving stage 932. At this stage of the operation, the seal member

912 is not particularly deformed by pressing in a pressing direction D3. Then, by introducing a fluid from a pressurization unit 935 (pressurized fluid source) into the pressurization chamber 930, the rigid member 911 is displaced (strokes) downward from a current state. Accordingly, the mold 901 and the object to be formed 902 are pressurized by the rigid member 911.

CITATION LIST

Patent Literature

Patent Literature 1: Japanese Utility Model Laid-Open No. 5-51616

Patent Literature 2: International Publication No. WO 2013/035759

SUMMARY OF INVENTION

Technical Problem

In treating a work having a large surface area, for example, in the conventional press device 800, an area of the pusher 803 (an area of the press surface 811 as viewed in a plan view) is also increased corresponding to the large surface area of the work. In this case, with respect to the press surface 811, a large pressing force corresponding to the area of the press surface 811 is generated due to Pascal's Principle. However, a resistance which the press surface 811 receives from the work 815 is also increased at the time of performing pressing by an amount of increased area of the press surface 811. Such a resistance is transmitted to the piston 802 via the press surface 811, the pusher 803 and the pressure transmission medium 804, and pushes back the piston 802 upward. Such a phenomenon decreases a pressing force generated on the press surface 811.

However, with respect to the conventional press device 800, a design which enables the press device 800 to withstand such a resistance is not particularly disclosed and hence, a problem on a resistance which occurs when pressing is performed with a large surface area cannot be solved. As a result, there may be a case where a sufficient pressing force cannot be generated on the press surface 811. As the work 815 described in the cited literature 1, an object to be pressed which is considerably deformed when the object is pressed is estimated. In such a case, the resistance is relatively small and hence, the problem does not become conspicuous. However, in the case of a work which is partially or wholly made of a material having high rigidity, for example, such a problem on a resistance becomes conspicuous and hence, a sufficient pressing force cannot be generated on the press surface.

Also, in another conventional press device 900, a design which enables the press device 900 to withstand the above-mentioned resistance is not particularly disclosed and hence, a problem on a resistance which occurs when pressing is performed with a large surface area cannot be solved. As a result, there may be a case where a sufficient pressing force cannot be generated on a press surface (a lower surface of the rigid member 911).

The present invention has been made in view of the above-mentioned circumstances, and it is an object of the present invention to provide a press device which can generate a sufficient pressing force on a press surface even when pressing is performed with a large surface area. Further, it is another object of the present invention to provide a press method which can generate a sufficient pressing force on a press surface even when pressing is performed with a large surface area. It is still another object of the present invention to provide "a method of manufacturing a pressed product" which can be manufactured by such a method.

Solution to Problem

[1] According to one aspect of the present invention, there is provided a press device which presses a work by driving a press plate by a fluid pressure in a chamber. The press device includes: a press head including: the press plate having a press surface which forms a work contact surface; a chamber base body disposed in a state where the chamber base body faces the press plate; and an elastic packing formed in a ring shape as viewed in a plan view and disposed between the press plate and the chamber base body; and a provisional pressing unit including: a provisional pressing plate configured to transmit a provisional pressing force in a provisional pressing direction which is a direction along which the work is disposed; and a provisional pressing force applying mechanism configured to give the provisional pressing force to the provisional pressing plate.

In the press device, the chamber is formed of a space surrounded by an inner surface of the press plate, an inner surface of the chamber base body and the elastic packing. The chamber is configured to generate a main pressing force to the work placed on the press surface by introducing a pressurized fluid into the chamber from a pressurized fluid source in a state where the elastic packing is deformed by compression in provisional pressing performed by the provisional pressing unit. The press device further includes a suppression unit configured to suppress movement of the provisional pressing plate in a counter provisional pressing direction which is a direction opposite to the provisional pressing direction.

According to another aspect of the present invention, there are provided a press method of pressing a work using a predetermined press device, and a method of manufacturing a press product obtained by pressing a work using the press device.

The predetermined press device includes: a press head including: a press plate having a press surface which forms a work contact surface; a chamber base body disposed in a state where the chamber base body faces the press plate; and an elastic packing formed in a ring shape as viewed in a plan view and disposed between the press plate and the chamber base body; and a provisional pressing unit including: a provisional pressing plate configured to transmit a provisional pressing force in a provisional pressing direction which is a direction along which the work is disposed; and a provisional pressing force applying mechanism configured to give the provisional pressing force to the provisional pressing plate; and a suppression unit configured to suppress movement of the provisional pressing plate in a counter provisional pressing direction which is a direction opposite to the provisional pressing direction. The chamber is formed of a space surrounded by an inner surface of the press plate, an inner surface of the chamber base body and the elastic packing.

According to one aspect of the press method according to the present invention, the press method includes in a following order: a provisional pressing unit advancing step of advancing the provisional pressing unit in a direction along which the work is disposed; a provisional pressing step of provisionally pressing the work by further moving the provisional pressing unit in the direction along which the work is disposed, and of directly or indirectly deforming the elastic packing by compression; a suppression unit activating step of activating the suppression unit while maintaining a state where the elastic packing is deformed by compression so as to restrict a displacement of the provisional pressing plate in the counter provisional pressing direction; and a main pressing step of generating a main pressing force on the work placed on the press surface by driving the press plate by introducing a pressurized fluid to an inside of the chamber from a pressurized fluid source.

According to one aspect of the method of manufacturing a press product according to the present invention, the method of manufacturing a press product includes in a following order: a provisional pressing unit advancing step of advancing the provisional pressing unit in a direction along which the work is disposed; a provisional pressing step of provisionally pressing the work by further moving the provisional pressing unit in the direction along which the work is disposed, and of directly or indirectly deforming the elastic packing by compression; a suppression unit activating step of activating the suppression unit while maintaining a state where the elastic packing is deformed by compression so as to restrict a displacement of the provisional pressing plate in the counter provisional pressing direction; and a main pressing step of generating a main pressing force on the work placed on the press surface by driving the press plate by introducing a pressurized fluid to an inside of the chamber from a pressurized fluid source.

[3] In the press device described in the above-mentioned [1] and [2], the provisional pressing force applying mechanism may be disposed on a side opposite to a side where the work is disposed as viewed from the provisional pressing plate, and may be configured to apply the provisional pressing force to the provisional pressing plate.

[4] In the press device described in the above-mentioned [1] and [2], the provisional pressing force applying mechanism may be configured to give the provisional pressing force to the provisional pressing plate by pulling the provisional pressing plate.

Advantageous Effects of the Invention

According to the press device and the press method of the present invention, it is possible to generate a sufficient pressing force on the press surface even when pressing is performed with a large surface area.

BRIEF DESCRIPTION OF DRAWINGS

FIG. 1A and FIG. 1B are views for describing a press device 1 according to an embodiment 1.

DESCRIPTION OF EMBODIMENTS

Figure 2A:
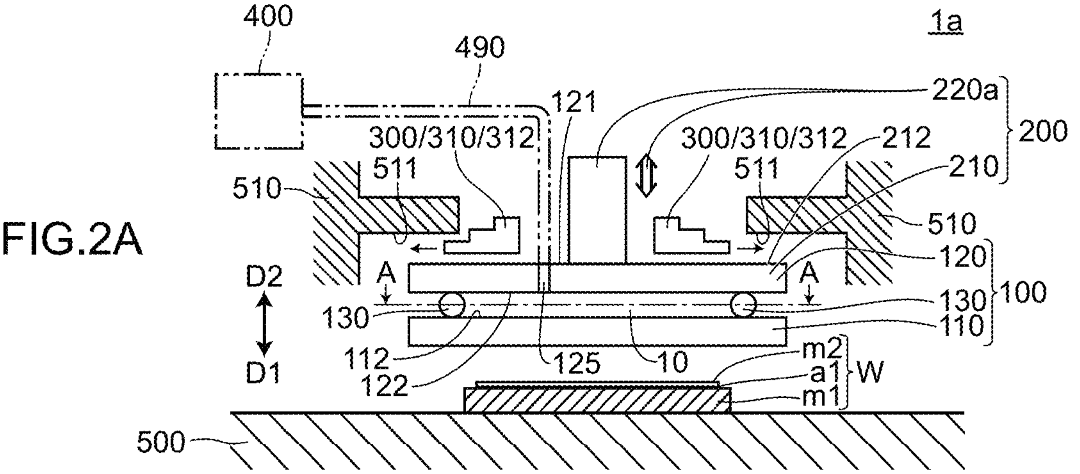
FIG. 2A to FIG. 2C are views for describing variations of a provisional pressing force applying mechanism (provisional pressing force applying mechanisms 220*a*, 220*b*, 220*c*).

Hereinafter, embodiments of a press device and a press method according to the present invention are described with reference to drawings. The respective drawings are schematic views which illustrate one example, and do not strictly reflect actual sizes, ratios and the like.

Embodiment 1

1. Configuration of Press Device 1 According to Embodiment 1

FIG. 1A and FIG. 1B are views for describing a press device 1 according to an embodiment 1. FIG. 1A is a cross-sectional view of the press device 1. FIG. 1B is a view of an elastic packing 130 taken along a line A-A in FIG. 1A and viewed in a direction along a provisional pressing direction D1. FIG. 1B also shows a press plate 110 together with the elastic packing 130. A relationship is established that a mode of the elastic packing 130 and the press plate 110 depicted in FIG. 1A is equal to a mode of a cross-sectional view taken along a line B-B in FIG. 1B.

(1) Overall Structure of Press Device 1

As shown in FIG. 1A, the press device 1 according to the embodiment 1 is a press device which presses a work W by driving the press plate 110 (described later) using a fluid pressure in a chamber 10 (described later). The press device 1 includes a press head 100 and a provisional pressing unit 200.

The work W is an object to be pressed. Any object may be used as the work W. For example, the work W may be a work to which laminate treatment is applied. In FIG. 1A, the work W made of a material m1, a material m2 and an adhesive agent al is illustrated. The press device 1 according to the embodiment 1 is preferably carried out even when the material m1 is a material having high rigidity.

In the embodiment 1, the work W is disposed between the press plate 110 (described later) and a table 500 which forms a platform.

(2) Press Head 100

The press head 100 is a head which performs a press operation by applying a pressing force to the work W. The press head 100 includes the press plate 110, a chamber base body 120 and the elastic packing 130.

The press plate 110 has a press surface 111 which forms a surface brought into contact with the work W (work contact surface). The press plate 110 has an "inner surface 112 of the press plate" which forms a portion of the chamber 10 described later on a side opposite to the press surface 111 as viewed from the press plate 110. The press plate 110 is a rigid body.

The press surface 111 is a surface which is brought into contact with the work W and presses the work W. The press surface 111 may have any shape. The press surface 111 may be a flat surface which is a surface shown in the attached drawings, a bent surface, or an uneven surface which follows the shape of an upper side of the work W.

In this embodiment, the "inner surface 112 of the press plate" may have any shape. However, it is desirable that the "inner surface 112 of the press plate" be a flat surface.

When the press device 1 is used as a laminator, a heater (not illustrated in the drawing) may be incorporated in the press plate 110 or/and the table 500.

The chamber base body 120 has the "inner surface 122 of the chamber base body" which forms a portion of the chamber 10. The chamber base body 120 is disposed such that the chamber base body 120 faces the press plate 110. Specifically, the "inner surface 122 of the chamber base body" faces the inner surface 112 of the press plate. In this embodiment, the "inner surface 122 of the chamber base body" may have any shape. However, it is desirable that the "inner surface 122 of the chamber base body" be a flat surface for forming the chamber 10 in cooperation with the inner surface 112 of the press plate which is a flat surface in the example described above.

The chamber base body 120 has an "outer surface 121 of the chamber base body" on a side opposite to the "inner surface 122 of the chamber base body" as viewed from the chamber base body 120. The chamber base body 120 is a rigid body.

A fluid introducing opening 125 which penetrates between an outer portion of the chamber base body 120 and the "inner surface 122 of the chamber base body" is formed in the chamber base body 120. A pressurized fluid FL (described later) can be introduced into the chamber 10 through this fluid introducing opening 125.

The elastic packing 130 is a member which is elastically deformed when the elastic packing 130 receives a force from the outside. A shape of a cross section of the elastic packing 130 taken along a plane perpendicular to a length direction of the elastic packing 130 is not particularly limited. However, the cross section of the elastic packing 130 may have a circular shape, for example (see FIG. 1A).

As illustrated in FIG. 1B, the elastic packing 130 has a ring shape as viewed along the provisional pressing direction D1 (as viewed in a plan view). An area inside the ring becomes an area corresponding to the chamber 10.

The elastic packing 130 is disposed between the press plate 110 and the chamber base body 120, and interrupts coming and going of a substance between the area inside the ring and the area outside the ring.

(3) Provisional Pressing Unit 200

The provisional pressing unit 200 is a unit which provisionally presses the work W in the provisional pressing direction D1 and deforms the elastic packing 130 by compression. The provisional pressing unit 200 includes a provisional pressing plate 200 and a provisional pressing force applying mechanism 220.

The provisional pressing plate 210 transmits a provisional pressing force in the provisional pressing direction D1 which is a direction along which the work W is disposed. In the press device 1 according to the embodiment 1, the provisional pressing plate 210 also serves as the above-mentioned chamber base body 120.

The provisional pressing plate 210 is a rigid body. It is desirable that an inner surface of the provisional pressing plate 210 on a work W arrangement side be a flat surface. The provisional pressing plate 210 has a second wall 212 on a side opposite to the work W arrangement side as viewed from the provisional pressing plate 210. The second wall 212 is a wall which is brought into contact with a suppression unit 300 (described later).

The provisional pressing force applying mechanism 220 is a mechanism which gives (applies) a provisional pressing force to the provisional pressing plate 210. The provisional pressing force applying mechanism 220 is schematically indicated by a bold arrow in FIG. 1A and the like. However, the provisional pressing force applying mechanism 220 may be realized with any configuration provided that the provisional pressing force applying mechanism 220 can give a provisional pressing force to the provisional pressing plate 210.

Figure 2B:
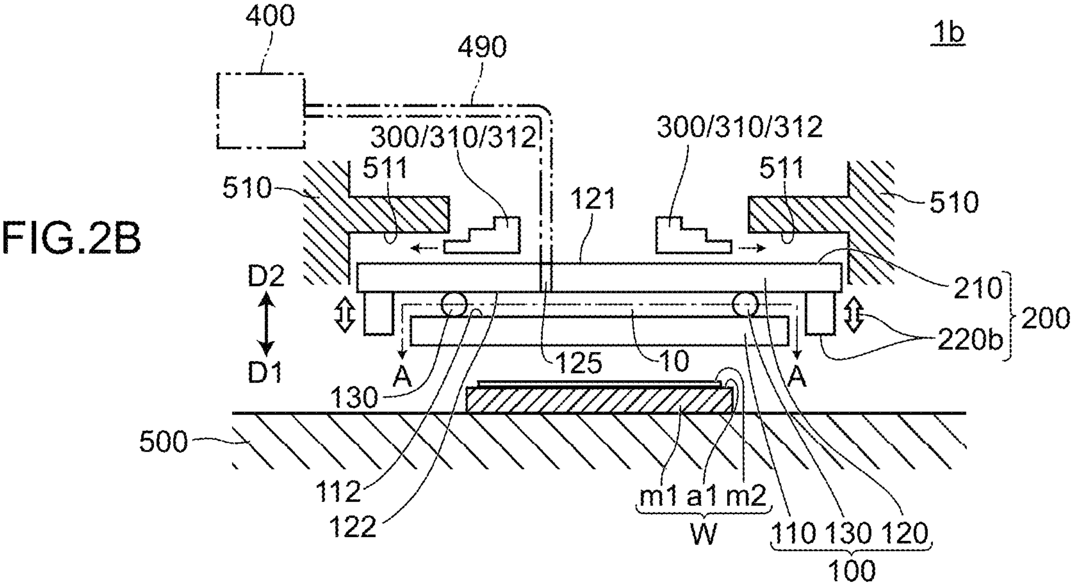
Figure 2C:
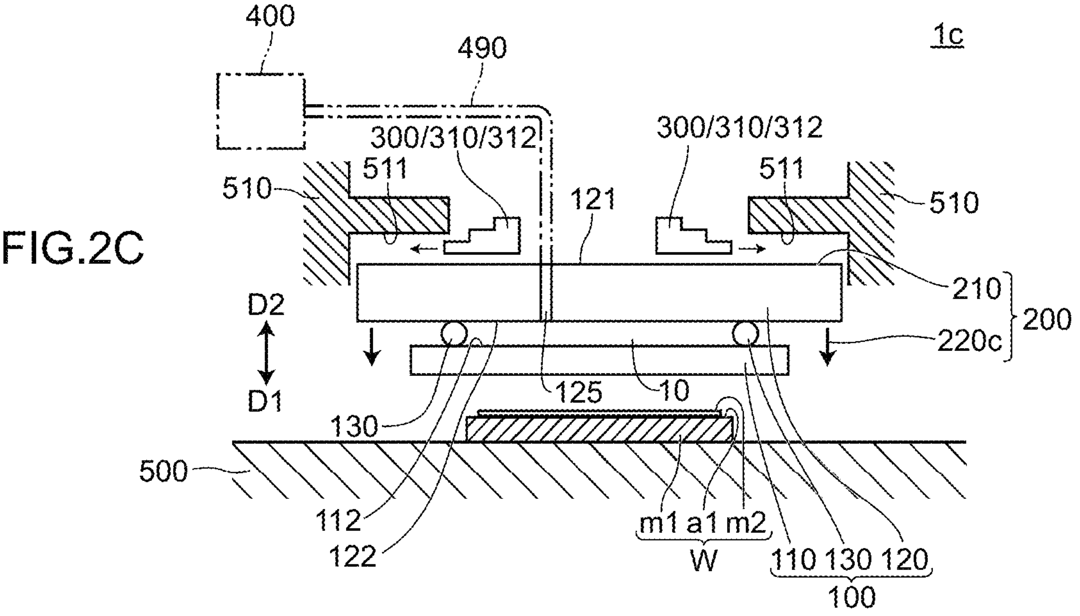

FIG. 2A to FIG. 2C are views for describing variations of the provisional pressing force applying mechanism (provisional pressing force applying mechanisms 220*a*, 220*b*, 220*c*).

FIG. 2A shows the provisional pressing force applying mechanism 220*a* of a type which presses toward a work W side from above the provisional pressing plate 210. That is, the provisional pressing force applying mechanism 220*a* is disposed on a side opposite to a side where the work W is disposed as viewed from the provisional pressing plate 210, and applies a provisional pressing force to the provisional pressing plate 210.

In FIG. 2A, the provisional pressing force applying mechanism 220*a* is schematically indicated by a suitable member (not indicated by a symbol) which is connected to the provisional pressing plate 210 and a bold arrow. However, the provisional pressing force applying mechanism 220*a* may be realized with any configuration provided that the provisional pressing force applying mechanism 220*a* can give a provisional pressing force to the provisional pressing plate 210. For example, the provisional pressing force applying mechanism 220*a* may be realized by a servo motor, a ball screw and the like not shown in the drawings, or may be realized by a hydraulic cylinder not shown in the drawing.

FIG. 2B shows the provisional pressing force applying mechanism 220*b* of a type which pulls the provisional pressing plate 210 downward. That is, the provisional pressing force applying mechanism 220*b* gives a provisional pressing force to the provisional pressing plate 210 by pulling the provisional pressing plate 210.

In FIG. 2B, the provisional pressing force applying mechanism 200*b* is schematically indicated by a suitable member (not indicated by a symbol) which is connected to the provisional pressing plate 210 and a bold arrow. However, the provisional pressing force applying mechanism 220*b* may be realized with any configuration provided that the provisional pressing force applying mechanism 220*b* can give a provisional pressing force to the provisional pressing plate 210.

For example, the provisional pressing force applying mechanism 220*b* may be configured to positively pull the provisional pressing plate 210 from the side where the work W is disposed using a servo motor, a ball screw or the like not shown in the drawing or a hydraulic cylinder not shown in the drawing. Further, the provisional pressing force applying mechanism 220*b* may be realized by adopting the configuration where the provisional pressing plate 210 is pulled downward by temporarily suspending a weight downward (a side on which gravitational acceleration acts) from a lower surface of the provisional pressing plate 210 in a provisional pressing step (described later).

FIG. 2C is a view for describing the provisional pressing force applying mechanism 220*c* of a mode where a provisional pressing force is applied by making use of a weight (gravity) of the provisional pressing plate 210. An arrow in the drawing indicates the weight of the provisional pressing plate 210, and the weight (gravity) corresponds to a provisional pressing force.

As shown in FIG. 2C, the provisional pressing force applying mechanism 220*c* adopts the configuration where the weight (gravity) of the provisional pressing plate is used to act as a provisional pressing force while increasing a mass of the provisional pressing plate itself to a correspondingly large size. In a broader meaning, it is safe to say that this provisional pressing force applying mechanism 220*c* is included in the provisional pressing force applying mechanism 220*b* of a type which pulls the provisional pressing plate 210 downward as shown in FIG. 2B.

In the description of embodiments and modifications introduced hereinafter and in FIG. 2A to FIG. 7C, all provisional pressing force applying mechanisms are described and illustrated using the schematic provisional pressing force applying mechanism 220 shown in FIG. 1A and FIG. 1B. With respect to the variations (FIG. 2A to FIG. 2C) described and illustrated above, such variations are also applicable to the embodiments and the modifications described hereinafter with reference to FIG. 2A to FIG. 7C.

Further, the provisional pressing force applying mechanism 220 may have not only a function of giving a provisional pressing force but also a function of changing a distance between the work W and the provisional pressing plate 210, that is, a function of changing a clearance between the provisional pressing plate 210 (also including the press head 100 in the embodiment 1) and the work W by elevating or lowering the provisional pressing plate 210.

(4) Chamber 10 and Mechanism for Generating Main Pressing Force

The chamber 10 is formed of a space surrounded by the inner surface 112 of the press plate, the inner surface 122 of the chamber base body and the elastic packing 130 described above.

The chamber 10 is formed so as to generate a main pressing force PR2 <see FIG. 4E described later with respect to the symbol> to the work W placed on the press surface 111 by introducing a pressurized fluid FL <<see FIG. 4E described later with respect to the symbol>> into the chamber 10 from the pressurized fluid source 400 in a state where the elastic packing 130 is deformed by compression by provisional pressing performed by the provisional pressing unit 200.

The pressurized fluid source 400 may be formed of: a fluid source (not shown in the drawing) such as a compressed air source in a factory, for example; and a booster (not shown in the drawing) which increases a fluid pressure from the fluid source. The pressurized fluid FL supplied from the pressure fluid source 400 is introduced into the chamber 10 from the fluid introducing opening 125 formed in the chamber base body 120 through a fluid path such as a tube 490. The pressurized fluid source 400 is disposed outside the press device 1 in FIG. 1A. However, the arrangement of the pressurized fluid source 400 is not limited to such an arrangement, and the pressurized fluid source 400 may be incorporated in the press device 1.

(5) Suppression Unit 300

When the main pressing force PR2 is generated, a large resistance is generated from a work W side and hence, the press device 1 further includes the suppression unit 300 such that the press device 1 withstands the resistance. The suppression unit 300 suppresses the movement of the provisional pressing plate 210 in a counter provisional pressing direction D2 which is a direction opposite to the provisional pressing direction D1 thus restricting the displacement of the provisional pressing plate 210 in the counter provisional pressing direction D2.

The suppression unit 300 may be realized by any configuration. In the example shown in FIG. 1A and FIG. 1B, the suppression unit 300 is formed of a stopper 310.

Specifically, the stopper 310 is a wedge-shaped member which is inserted between a first wall 511 of a fixed portion 510 and the second wall 212 of the provisional pressing plate 210. The wedge-shaped member is formed in a stepped shape where a thickness of the member changes depending on positions (stepped wedge-shaped member 312).

The fixed portion 510 is a portion which is fixed to the platform (table 500), and is a rigid portion.

In the press device 1 according to the embodiment 1, the stopper 310 is formed such that a portion of the stopper 310 is brought into contact with ("fixed to" in a modification 7 described later) the fixed portion 510, and another portion of the stopper 310 is directly brought into contact with the provisional pressing plate 210. In the modification 4 described later, another portion of the stopper 310 is indirectly brought into contact with the provisional pressing plate 210 by way of a member which is connected to the provisional pressing plate 210.

In the example shown in FIG. 1A and FIG. 1B, the stopper 310 is formed such that one portion (a stepped portion having a stepped shape) of the stopper 310 is brought into contact with the predetermined fixed portion 510, and another portion (a portion on a side opposite to the stepped portion) of the stopper 310 is directly brought into contact with the provisional pressing plate 210.

2. Operation of Press Device 1/Press Method/Method of Manufacturing Press Product According to the Embodiment 1

Next, a press method according to the embodiment 1 is described with reference to FIG. 3 to FIG. 4E. The operation of the press device 1 and the method of manufacturing a press product according to the embodiment 1 have substantially the same content as the press method according to the embodiment 1. Accordingly, the description of the operation of the press device 1 and the method of manufacturing a press product uses the following description of the press method.

Figure 3:
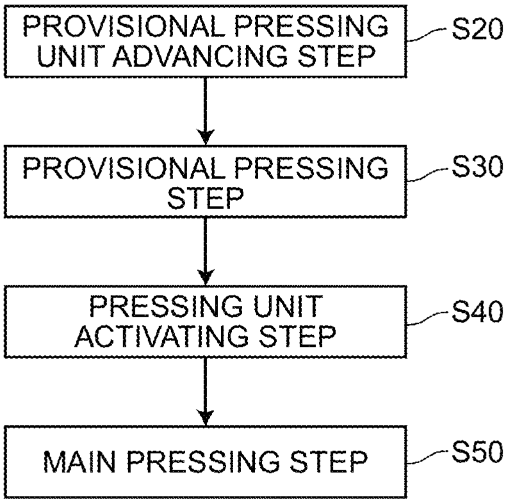
FIG. 3 is a flowchart for describing a press method according to the embodiment 1.

FIG. 3 is a flowchart for describing the press method according to the embodiment 1. FIG. 4A to FIG. 4E are set of cross-sectional views of the press device 1 for describing a series of steps ranging from a provisional pressing unit advancing step S20 to a main pressing step S50 in the press method according to the embodiment 1. In any one of FIG. 4A to FIG. 4E, only main parts necessary for the description are illustrated, and other parts are omitted from the drawings.

(1) Summary of Press Method According to Embodiment 1

The press method according to the embodiment 1 is a method which presses a work using the predetermined press device described below.

That is, the predetermined press device includes the press head 100, the provisional pressing unit 200, and the suppression unit 300. In the above-mentioned configuration, the press head 100 includes: "the press plate 110" having the press surface 111 which forms a work contact surface; "the chamber base body 120" which is disposed so as to face the press plate 110; and "the elastic packing 130" having a ring shape as viewed in a plan view and being disposed between the press plate 110 and the chamber base body 120. The provisional pressing unit 200 includes: "the provisional pressing plate 210" which transmits a provisional pressing force PR1 <see FIG. 4C described later with respect to the symbol> in the provisional pressing direction D1 which is the direction along which the work w is disposed; and "the provisional pressing force applying mechanism 220" which gives (applies) a provisional pressing force to the provisional pressing plate 210. The suppression unit 300 suppresses the movement of the provisional pressing plate 210 in the counter provisional pressing direction D2 which is the direction opposite to the provisional pressing direction D1. The chamber 10 is formed of the space surrounded by the inner surface 112 of the press plate, the inner surface 122 of the chamber base body, and the elastic packing 130 (see also FIG. 1A and FIG. 1B).

In the predetermined press device described above, with respect to the provisional pressing force applying mechanism, the configuration may be adopted where the provisional pressing force applying mechanism is disposed on a side opposite to a side where the work W is disposed as viewed from the provisional pressing plate 210, and the pressing force applying mechanism applies a provisional pressing force to the provisional pressing plate 210 (an example of 220*a* in FIG. 2A). Alternatively, with respect to the provisional pressing force applying mechanism, the configuration may be adopted where a provisional pressing force is given to the provisional pressing plate by pulling the provisional pressing plate (an example of 220*b* shown in FIG. 2B, an example of 220*c* shown in FIG. 2(*c*)).

As shown in FIG. 3, the press method according to the embodiment 1 includes the provisional pressing unit advancing step S20, the provisional pressing step S30, the pressing unit activating step S40, and the main pressing step S50 in this order.

A work supply step S10 may be provided before the provisional pressing unit advancing step S20. Further, after the main pressing step S50 is finished, a pressurized fluid introduction releasing step S60, a suppression unit inactivating step S70 and a provisional pressing unit retracting step S80 may be provided in this order (any one of these steps not shown in the drawings).

(2) Detail of Press Method (2-1) Work Supply Step S10

The work supply step S10 is a step where the work W is supplied to the press device 1 by arranging the work W between the table 500 and the press head 100.

(2-2) Provisional Pressing Unit Advancing Step S20

Figures 4A, 4B, 4C, 4D, 4E:
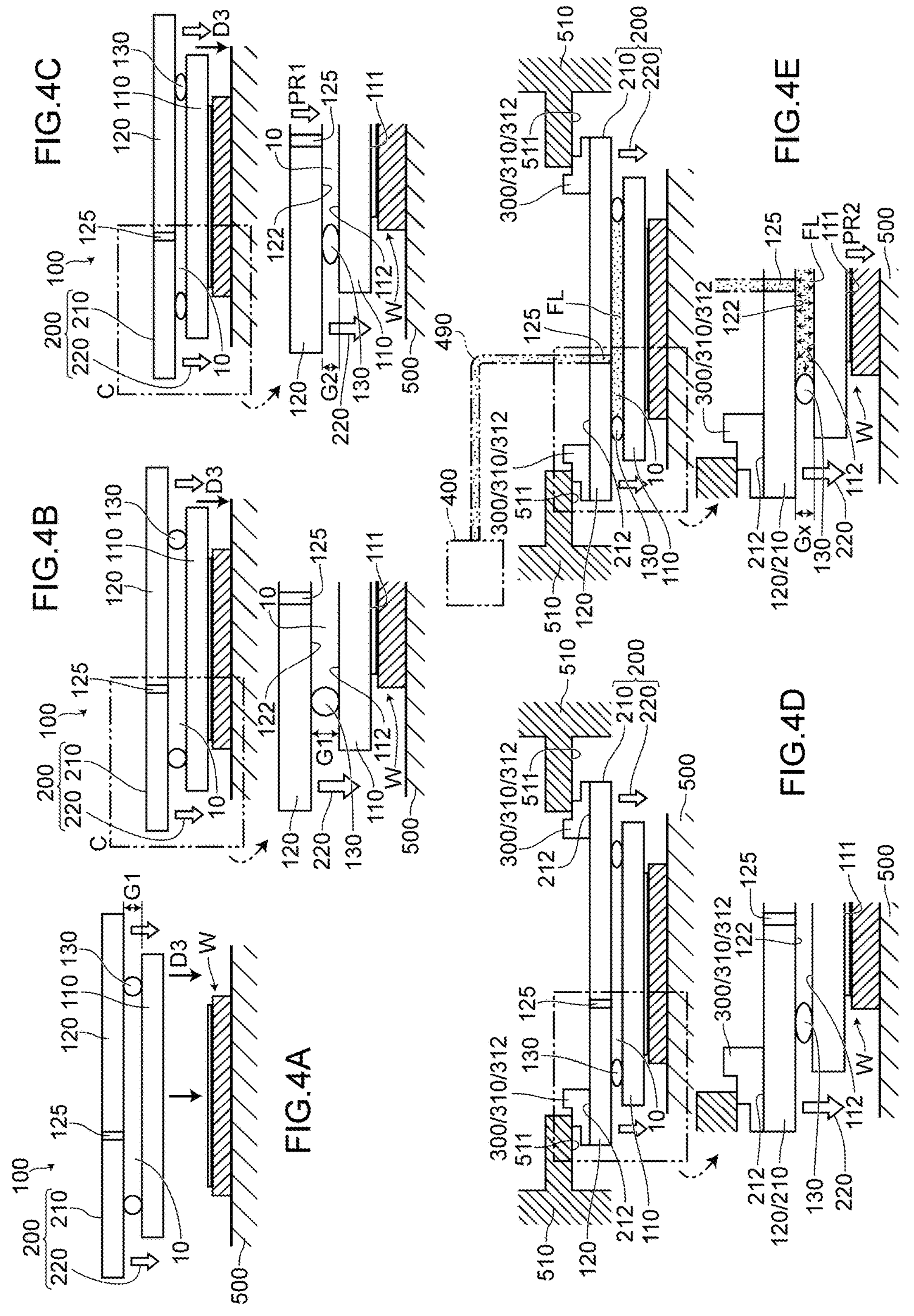
FIG. 4A to FIG. 4E are cross-sectional views of the press device 1 for describing a provisional pressing unit advancing step S20 to a main pressing step S50 in the press method according to the embodiment 1.

FIG. 4A is a cross-sectional view showing the provisional pressing unit advancing step S20.

The provisional pressing unit advancing step S20 is a step where the provisional pressing unit 200 is made to advance in a direction D3 along which the work W is disposed. Specifically, the provisional pressing unit advancing step S20 is a step where a front surface side and a back surface side of the work W are brought into contact with other members including the press surface 111, and the provisional pressing unit 200 is made to advance to a state in which the elastic packing 130 is not yet deformed by compression <state shown in FIG. 4B in embodiment 1>.

At this stage of the operation, the elastic packing 130 is not deformed by compression by the press head 100, and a distance between the press plate 110 and the chamber base body 120 (a gap of the chamber) is approximately G1.

In the embodiment 1, the provisional pressing plate 210 of the provisional pressing unit 200 also serves as the chamber base body 120 of the press head 100. Accordingly, the press head 100 also advances (is lowered) along with the advancing (lowering) of the provisional pressing unit 200.

(2-3) Provisional Pressing Step S30

FIG. 4B is a cross-sectional view showing a stage at which the provisional pressing step S30 starts. A view described in a lower part of FIG. 4B is a main-part enlarged cross-sectional view in which an area surrounded by a double-dashed chain line C in an upper part of FIG. 4B is enlarged <<hereinafter, the same understanding being applicable to a double-dashed chain line C in FIG. 4C to FIG. 4E described hereinafter>>. FIG. 4C is a cross-sectional view showing a stage at which the provisional pressing step S30 is completed.

The provisional pressing step S30 is a step where the provisional pressing unit 200 is made to further move in the direction D3 along which the work W is disposed, and the work W is provisionally pressed and the elastic packing 130 is deformed by compression directly or indirectly.

When the provisional pressing step S30 is performed, the elastic packing 130 is deformed by compression by a provisional pressing force PR1. Accordingly, assuming a gap of the chamber before the provisional pressing step S30 starts as G1, the gap of the chamber after the provisional pressing step S30 is finished becomes G2 (G2<G1).

(2-4) Pressing Unit Activating Step S40

FIG. 4D is a cross-sectional view for describing the pressing unit activating step S40.

The pressing unit activating step S40 is a step where the suppression unit 300 is activated while maintaining a state where the elastic packing 130 is deformed by compression so as to restrict the displacement of the provisional pressing plate 210 in the counter provisional pressing direction D2.

Specifically, for example, the stopper 310 (more specifically, the wedge-shaped member 312 having a stepped shape where a thickness changes depending on positions) is adopted as the suppression unit 300, and the stopper 310 is inserted between the first wall 511 of the fixed portion 510 and the second wall 212 of the provisional pressing plate 210 thus activating the suppression unit 300. At this stage of the operation, a portion (a stepped portion having a stepped shape) of the stopper 310 is brought into contact with the predetermined fixed portion 510, and another portion (a portion on a side opposite to the stepped portion) of the stopper 310 is directly brought into contact with the provisional pressing plate 210.

With such a configuration, it is possible to prevent the provisional pressing plate 210 from moving in the counter provisional pressing direction D2. At this stage of the operation, the gap of the chamber is maintained at approximately G2. The position of the press surface 111 in this state <FIG. 4D> becomes an origin when main pressing is performed (main pressing origin).

During a period from a point of time that the suppression unit 300 is activated to a point of time that the pressurized fluid introduction releasing step S60 is performed by way of the main pressing step S50, a power source of the provisional pressing force applying mechanism 220 may be turned off.

(2-5) Main Pressing Step S50

FIG. 4E is a cross-sectional view for describing the main pressing step S50.

The main pressing step S50 is a step where a main pressing force PR2 is generated on the work W placed on the press surface 111 by driving the press plate 110 by introducing the pressurized fluid FL into the chamber 10 from the pressurized fluid source 400.

Specifically, the pressurized FL supplied from the pressurized fluid source 400 is introduced into the chamber 10 from the fluid introducing opening 125 of the chamber base body 120 through the fluid path such as the tube 490 or the like. A pressure of the pressurized fluid FL can be suitably set.

By performing the steps described above, the main pressing force PR2 is generated, and the work W is pressed in a thickness direction. Accordingly, the press device can acquire a requested predetermined purpose.

At this stage of the operation, the gap of the chamber becomes Gx (G2≤Gx<G1).

(2-6) Post Treatment

Then, the introduction of the pressurized fluid FL into the chamber 10 is interrupted in the pressurized fluid introduction releasing step S60, and the inside of the chamber 10 is opened to the atmosphere (not shown in the drawing). Next, in the suppression unit inactivating step S70, the suppression unit 300 is released and inactivated (not shown in the drawings). Next, in the provisional pressing unit retracting step S80, the provisional pressing unit 200 is moved (retracted) in a direction opposite to the direction D3 along which the work W is disposed thus generating a clearance between the work W and the predetermined member (not shown in the drawing). Then, a work W' (not shown in the drawing) obtained by applying such press treatment to the work W is taken out to the outside from the press device 1.

3. Advantageous effects acquired by press device 1, press method and the method of manufacturing press product according to embodiment 1.

The press device 1 according to the embodiment 1 has the configuration described above and hence, the following advantageous effects can be obtained.

(1) The press device 1 according to the embodiment 1 has "suppression unit 300" described above. Accordingly, even when a large resistance is generated from the side of the work W during pressing, the suppression unit 300 restricts the displacement of the provisional pressing plate 210 in the counter provisional pressing direction D2 and hence, the movement of the provisional pressing plate 210 in the counter provisional pressing direction D2 can be suppressed. Accordingly, a sufficient pressing force PR2 can be generated on the press surface 111 without changing a volume of the chamber 10, that is, without reducing a fluid pressure in the chamber 10.

As a result, according to the press device 1 of the embodiment 1, a sufficient pressing force can be generated on the press surface even when pressing is performed by the press surface having a large surface area.

The press device 1 according to the embodiment 1 is suitably applicable particularly when pressing is performed by a press surface having a large surface area.

For example, assume that an area (an area of a region inside a ring which the elastic packing 130 forms) of the chamber 10 as viewed in a plan view is 400 $cm^2$ (longitudinal size: 20 cm×lateral side: 20 cm). Also assume that a pressure of compressed air in a factory is 0.5 Mpa (5 $kgw/cm^2$), and air whose pressure is increased 4 times compared to the pressure by a booster is used as "pressurized fluid FL". By introducing pressurized fluid FL into the chamber 10, a force generated in the region inside the ring (eventually a main pressing force PR2 generated on the press surface 111) becomes a value which corresponds to 8 tw (400×20=8000 kgw=8 tw). Accordingly, magnitude of the resistance becomes a value corresponding to such a force (for example 8 tw) although it depends on a characteristic of the work W.

Accordingly, for example, in another conventional press device 900, the pressurization chamber housing 933 cannot withstands a resistance so that the pressurization chamber housing 933 is pushed back upward. As a result, a pressing force generated on a press surface (a lower surface of the rigid member 911) is decreased.

On the other hand, the press device 1 according to the embodiment 1 includes the suppression unit 300 described above and hence, such a phenomenon does not occur so that a sufficient pressing force PR2 can be generated on the press surface 111.

(2) In the press device 1 according to the embodiment 1, a substantial stroke amount in main pressing is minimized. That is, using a level of the press surface 111 at a point of time the above-mentioned suppression unit activating step S40 is completed as a reference, an amount (displacement) that the compressed elastic packing 130 extends toward an original state due to introduction of the pressurized fluid FL becomes a substantial stroke amount in main pressing. It is safe to say that this substantial stroke amount is approximately 0 macroscopically.

In this manner, in main pressing (main pressing step S50) which is a scene where a large force is generated, a stroke of the related member is minimum and hence, the press device 1 according to the embodiment 1 becomes a press device having a high safety. Further, even when the introduction of the pressurized fluid FL becomes incomplete due to a defect or the like, only lowering of a pressure in the chamber 10 occurs, and further stroking of the press surface 111 in a pressing direction is not generated. Also, from this point of view, the press device 1 according to the embodiment 1 becomes a press device having extremely high safety.

On the other hand, a stroke necessary for main pressing is minimum and hence, it is possible to minimize a height of the chamber 10, and the volume of the chamber 10 can also be minimized corresponding to the minimizing of the height of the chamber 10. Accordingly, space efficiency is improved so that a high main pressing force can be outputted with smaller energy. Accordingly, the press device 1 according to the embodiment 1 becomes a resource saving press device.

(3) Further, during performing main pressing (main pressing step S50) a resistance is suppressed by the suppression unit 300/the stopper 310. Accordingly, during a resistance suppression period (time), power (for example, servo motor not shown in the drawings) of the provisional pressing force applying mechanism 220 may be turned off. Accordingly, the press device 1 according to the embodiment 1 becomes an energy saving press device.

For example, in place of the stopper 310, the elevation of the provisional pressing plate 210 can also be suppressed by outputting a force which resists the above-mentioned 8 tw using a servo motor having a high output (not shown in the drawing). However, it is necessary to supply a large amount of electricity during such a period. For example, when the press device is used as a laminator, the number of cases where main pressing for lamination requires 20 minutes to 30 minutes as a predetermined time of main pressing for lamination is not small, and there may be a case where main pressing requires a longer time, for example, approximately 1 hour. During such a period, a large amount of electricity is consumed. However, according to the press device 1 of the embodiment 1, during a period in which the provisional pressing plate 210 is suppressed by the stopper 310, power of such a servo motor (not shown in the drawings) is turned off and hence, consumption energy during such a period can be saved entirely.

(4) Further, as one preferred mode, the suppression unit 300 of the press device 1 is formed of the stopper 310, a portion of the stopper 310 is brought into contact with the predetermined fixed portion 510, and another portion of the stopper 310 is directory brought into contact with the provisional pressing plate 210.

Accordingly, with the simple configuration, the movement of the provisional pressing plate 210 in the counter provisional pressing direction D2 can be suppressed with certainty.

(5) Further, as one preferred mode, the stopper 310 of the press device 1 is formed of the wedge-shaped member 312 having a stepped shape which is inserted between the first wall 511 of the fixed portion 510 and the second wall 212 of the provisional pressing plate 210 and has a thickness which changes depending on positions. By adopting the stopper 310 having such a configuration, a distance between the first wall 511 and the second wall 212 can be properly changed in stages corresponding to a change in specification such as a thickness of the work W or a degree of compression of the elastic packing 130.

(6) Further, as one preferred mode, the chamber base body 120 also serves as the provisional pressing plate 210. Accordingly, the number of members can be decreased. Further, an occupation space can be omitted by an amount corresponding to the decrease of the number of members and hence, it is possible to provide an advantageous press devise also from an economical point of view.

(7) Further, the press method and the method of manufacturing a press product according to the embodiment 1 perform: the provisional pressing step S30 of deforming the elastic packing 130 by compression; the suppression unit activating step S40 of restricting the displacement of the provisional pressing plate 210 in the counter provisional pressing direction D2 by activating the suppression unit 300; and the main pressing step S50 of generating a main pressing force PR2 to the work W placed on the press surface 111 by driving the press plate 110 by introducing a pressurized fluid FL into the chamber 10, in this order.

Accordingly, even when a large resistance is liable to be generated from a side of the work W during pressing, the suppression unit 300 is activated in the suppression unit activating step S40 and hence, the movement of the provisional pressing plate 210 to the counter provisional pressing direction D2 can be suppressed. With such an operation, it is possible to generate a sufficient pressing force PR2 on the press surface 111 without changing a volume of the chamber 10, that is, without decreasing a fluid pressure in the chamber 10 even in the main pressing step S50.

As has been described above, according to the press method of the embodiment 1, even when pressing is performed by the pressing surface having a large surface area, it is possible to generate a sufficient pressing force on the press surface. The press method and the method of manufacturing a press product according to the embodiment 1 can be carried out using the press device 1 according to the embodiment 1 and hence, the advantageous effects brought about by the technical features of the press device 1 can be acquired in the same manner.

Embodiment 2

Figure 5:
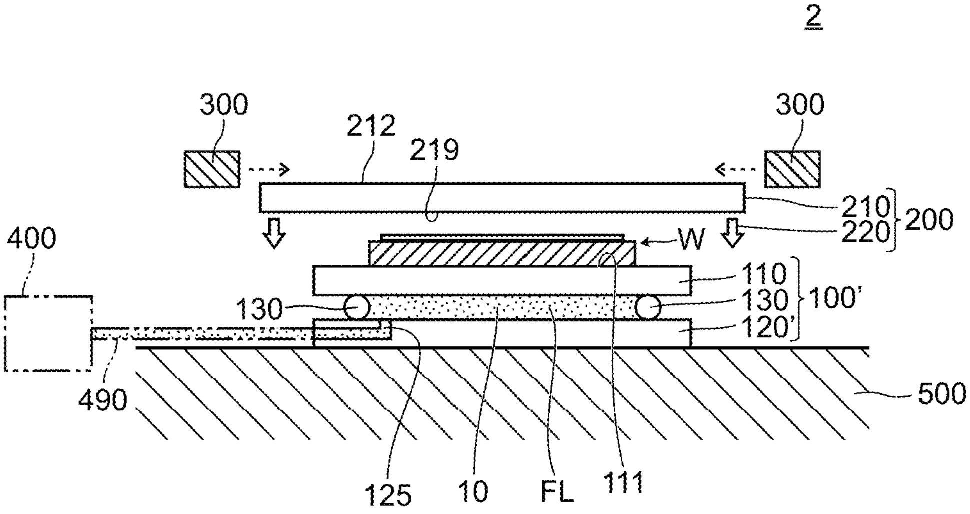
FIG. 5 is a cross-sectional view for describing a press device 2 according to an embodiment 2.

FIG. 5 is a cross-sectional view for describing a press device 2 according to a second embodiment. In the embodiment 2, with respect to constitutional elements which are identical with the corresponding constitutional elements of the embodiment 1 in the substantial configuration and technical features, the same symbols are used or the attaching of symbols is omitted, and the description of these constitutional elements is omitted.

The press device 2 according to the embodiment 2 basically has substantially the same configuration as the press device 1 according to the embodiment 1. However, the press device 2 according to the embodiment 2 differs from the press device 1 according to the embodiment 1 with respect to a point that a press head is disposed below a work W.

That is, as shown in FIG. 5, in the press device 2 according to the embodiment 2, a provisional pressing plate 210 and a press plate 110 are disposed such that the provisional pressing plate 210 and the press plate 110 face each other with a work W sandwiched between the provisional pressing plate 210 and the press plate 110, and a press head 100' is disposed below the work W. A fluid introducing opening 125 is formed in a chamber base body 120'. It is possible to introduce a pressurized fluid FL supplied from a pressurized fluid source 400 into a chamber 10 through a fluid introducing opening 125.

According to the press device 2 of the embodiment 2 having such a configuration, for example, when a liquid is used as a pressurized fluid, even if the liquid is leaked from the chamber 10, since the press head 100' having the chamber 10 is disposed below the work W, there is no possibility that the work W which is disposed above the chamber 10' is smeared.

The press device 2 according to the embodiment 2 basically has substantially the same configuration as the press device 1 according to the embodiment 1, with respect to the configuration other than the point that the press head 100' is disposed below the work W. Accordingly, the press device 2 of the embodiment 2 acquires corresponding advantageous effects found amongst all advantageous effects which the press device 1 according to the embodiment 1 acquires.

[Modifications]

Although the present invention has been described heretofore based on the above-mentioned embodiments, the present invention is not limited to the above-mentioned embodiments. The present invention can be carried out in various modes without departing from the gist of the present invention. For example, the following modifications are also conceivable.

(1) The numbers, the materials, the shapes, the positions, the sizes and the like of the constitutional elements described in the above-mentioned embodiment are provided for an exemplifying purpose, and these factors can be changed within a scope that the advantageous effects of the present invention are not impaired.

Figure 6A:
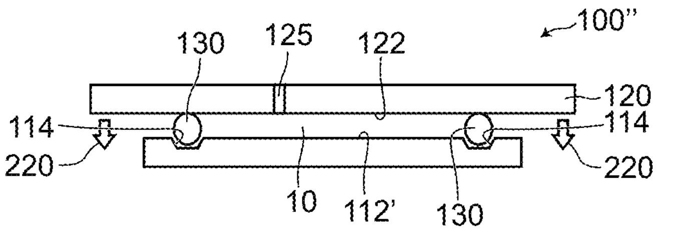
FIG. 6A to FIG. 6C are views for describing a modification.
Figure 6B:
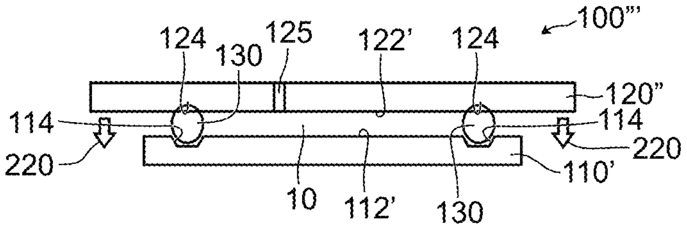
Figure 6C:
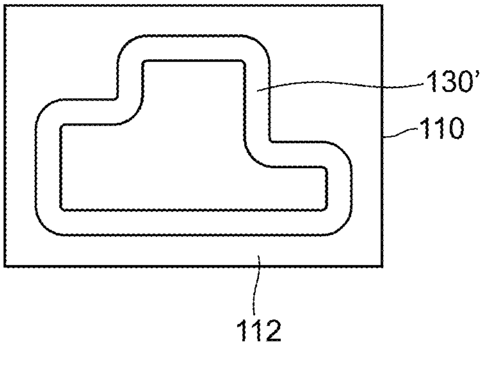

(2) FIG. 6A to FIG. 6C are views for describing modifications. FIG. 6A indicates a press head 100" of the modification 1, FIG. 6B indicates a press head 100'" of the modification 2, and FIG. 6C indicates an elastic packing 130' of the modification 3.

In the respective embodiments, the elastic packing 130 is disposed between the inner surface 112 of the press plate having the flat surface shape and the inner surface 122 of the chamber base body having the flat surface shape. However, the present invention is not limited to such an arrangement. As shown in FIG. 6A and FIG. 6B, a packing groove 114 may be formed on an inner surface side of at least one of the press plate 110' and the chamber base body 120, 120" which face each other, and the elastic packing 130 may be made to fall into the packing groove 114 and to engage with the packing groove 114 (modification 1 and modification 2).

By forming the packing groove 114 and by making the elastic packing 130 engage with the packing groove 114 in this manner, sealing property of the chamber 10 can be further enhanced.

Further, in a case where pressing is performed by forming a flat surface shape of the elastic packing into an arbitrary irregular shape other than an approximately rectangular or circular shape as described later, the elastic packing is pulled toward the outside by a fluid pressure when main pressing is performed. However, the movement of the elastic packing is restricted by the packing groove 114 and hence, pressing can be performed in a state where the elastic packing maintains the arbitrary irregular shape.

In the respective embodiments, the elastic packing 130 has an approximately rectangular ring shape as viewed in a plan view <see FIG. 1B>. However, in the present invention, the shape of the elastic packing 130 is not limited to such a shape. For example, the elastic packing 130 may be formed in a circular ring shape. Further, as shown in FIG. 6C, it may be possible to use the elastic packing 130' having an arbitrary irregular ring shape which conforms with the shape of the work W other than an approximately rectangular and circular ring shape (modification 3).

It is considered that a uniform fluid pressure is received in a region inside the ring which the elastic packing 130 or 130' forms and also on a press surface 111 side, a pressing force is uniformly generated in a portion corresponding to the region inside the shape of the ring. It is also considered that a main pressing force is also gradually lowered as a distance from the ring is increased in a portion corresponding to a region outside the shape of the ring. Based on such understanding, by properly setting the shape of the elastic packing 130, 130' corresponding to the shape of the work W to be pressed (see the elastic packing 130' having an arbitrary irregular shape or the like), it is enough to introduce an amount of pressurized fluid which is necessary and sufficient in a region which is necessary and sufficient. Accordingly, a load of a pressurized fluid source 400 is reduced correspondingly and hence, energy saving can be realized.

Figure 7A:
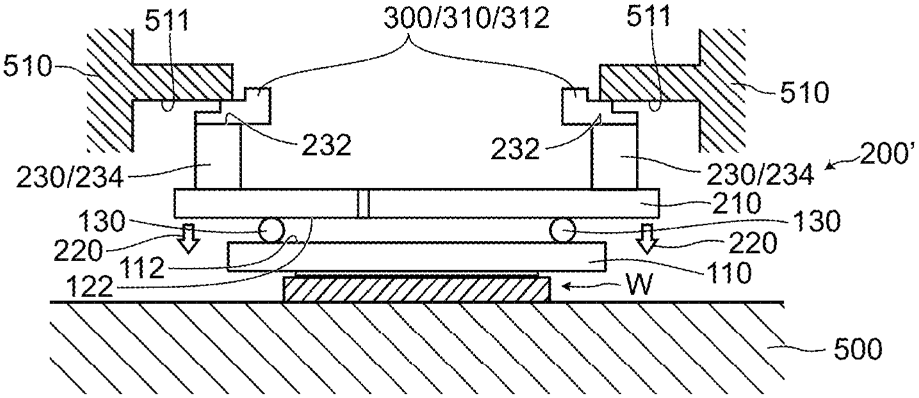
FIG. 7A to FIG. 7C are views for describing a modification.
Figure 7B:
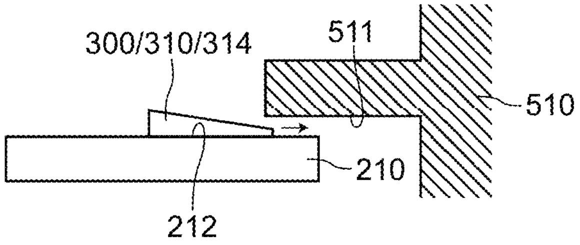
Figure 7C:
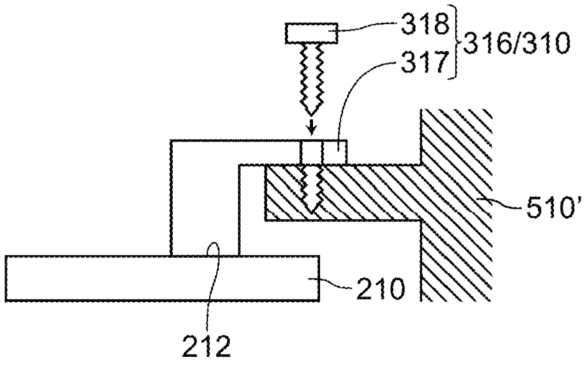
Figure 8A:
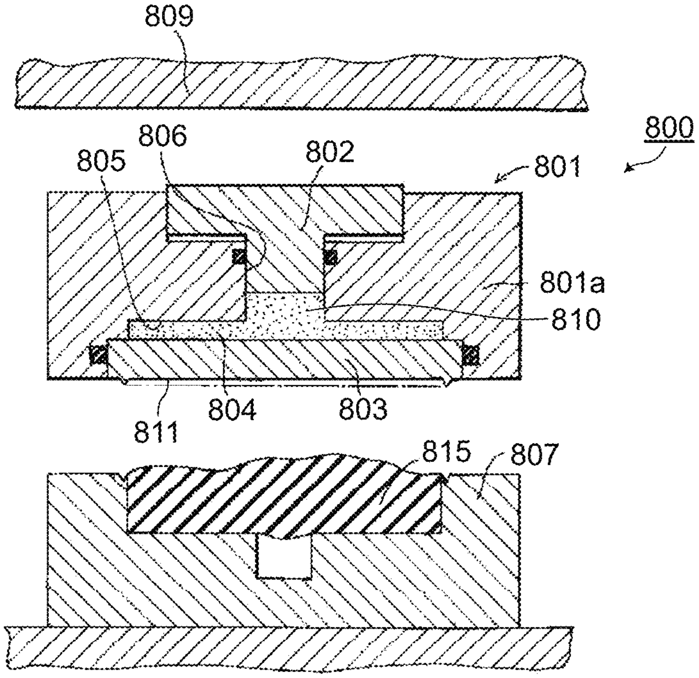
FIG. 8A and FIG. 8B are cross-sectional views for describing a forming mold (conventional press device 800) described in patent literature 1, and an imprinting device (another conventional press device 900) described in patent literature 2.
Figure 8B:
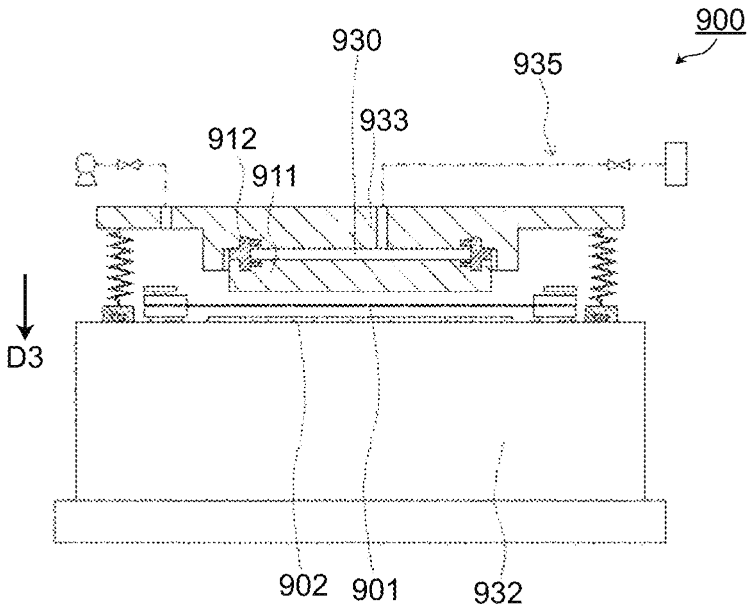

FIG. 7A to FIG. 7C are views for describing a modification. FIG. 7A shows a provisional pressing unit 200' of the modification 4, FIG. 7B shows a wedge-shaped member 314 having a tapered shape which is a suppression unit according to a modification 5, and FIG. 7C shows a semi-fixed (suppression adjustable) suppression jig 316 which is a suppression unit according to the modification 6.

The stopper 310 which forms the suppression unit 300 in the above-mentioned respective embodiments and above-mentioned modifications is directly brought into contact with the provisional pressing plate 210 using the wedge-shaped member 312 having a stepped shape, for example (see FIG. 1A and FIG. 1B, FIG. 4A to FIG. 5). However, the present invention is not limited to such a configuration. As shown in FIG. 7A, posts 234 may be introduced as the members 230 which are connected to the provisional pressing plate, and stoppers 310 may be inserted between the first wall 511 of the fixed portion 510 and the second walls 232 of the posts 234 (modification 4).

As shown in FIG. 7B, the wedge-shaped member 314 having a tapered shape whose thickness continuously changes may be formed as the stopper 310, and the wedge-shaped member 314 may be inserted between the first wall 511 of the fixed portion 510 and the second wall 212 (232) of the provisional pressing plate (or the member 230 which is connected to the provisional pressing plate such as the post 234) (modification 5).

By adopting such a wedge-shaped member 314 having a tapered shape, a distance between the first wall 511 and the second wall 212, 232 can also be changed properly, arbitrarily and in a stepless manner in accordance with a change in specification such as a thickness of the work W or the degree of compression of the elastic packing 130.

As shown in FIG. 7C, the semi-fixed suppression jig 316 may be introduced as the stopper 310. For example, the semi-fixed suppression jig 316 may be formed of a member 317 in which a loose hole is formed and a bolt screw 318, and a tap (a threaded hole) is formed in a fixed portion 510'. With such a configuration, the member 317 in which the loose hole is formed may be integrally mounted on the fixed portion 510 by allowing the bolt screw 318 to pass through the loose hole and allowing the bolt screw 318 to threadedly engage with the tap of the fixed portion 510. Then, the provisional pressing plate 210 can be directly or indirectly pressed by bringing a portion of the member 317 in which the loose hole is formed into contact with the provisional pressing plate 210 (or the member 230 which is connected to the provisional pressing plate such as the post 234) (modification 6).

(4) In the respective embodiments and the above-mentioned modifications, the examples where the fluid introducing opening 125 is formed in the chamber base body 120, 120', 120" are exemplified. However, the present invention is not limited to such examples. The liquid introducing opening 125 may be formed on a side of the press plate 110, 110'.

(5) In the respective embodiments and the above-mentioned modifications, the example where air is used as the pressurized fluid FL is exemplified. However, the present invention is not limited to such examples. For example, as the pressurized fluid FL, other gases (an inert gas and the like) and liquid such as water or oil may be used.

The invention claimed is:

1. A press device configured to press a work by driving a press plate by a fluid pressure in a chamber, the press device comprising:

a press head including: the press plate having a press surface which forms a work contact surface; a chamber base body disposed in a state where the chamber base body faces the press plate; and an elastic packing formed in a ring shape as viewed in a plan view and disposed between the press plate and the chamber base body; and a provisional pressing unit including: a provisional pressing plate configured to transmit a provisional pressing force in a provisional pressing direction which is a direction along which the work is disposed; and a provisional pressing force applying mechanism configured to give the provisional pressing force to the provisional pressing plate, wherein the chamber is formed of a space surrounded by an inner surface of the press plate, an inner surface of the chamber base body and the elastic packing, and the chamber is configured to generate a main pressing force to the work placed on the press surface by introducing a pressurized fluid into the chamber from a pressurized fluid source in a state where the elastic packing is deformed by compression in provisional pressing performed by the provisional pressing unit, and the press device further comprises a suppression unit configured to suppress movement of the provisional pressing plate in a counter provisional pressing direction which is a direction opposite to the provisional pressing direction.

2. The press device according to claim 1, wherein the provisional pressing force applying mechanism is disposed on a side opposite to a side where the work is disposed as viewed from the provisional pressing plate, and is configured to apply the provisional pressing force to the provisional pressing plate.

3. The press device according to claim 1, wherein the provisional pressing force applying mechanism is configured to give the provisional pressing force to the provisional pressing plate by pulling the provisional pressing plate.

4. The press device according to claim 1, wherein a packing groove is formed on an inner surface side of at least one of the press plate and the chamber base body which face each other, and the elastic packing is configured to engage with the packing groove by being made to fall into the packing groove.

5. The press device according to claim 1, wherein the chamber base body is configured to serve also as the provisional pressing plate.

6. The press device according to claim 1, wherein the provisional pressing plate and the press plate are disposed such that the provisional pressing plate and the press plate face each other with the work sandwiched between the provisional pressing plate and the press plate, and the press head is disposed below the work.

7. The press device according to claim 1, wherein the suppression unit is formed of a stopper, and the stopper is configured such that a portion of the stopper is brought into contact with or is fixed to a predetermined fixed portion, and another portion of the stopper is directly brought into contact with the provisional pressing plate or is indirectly brought into contact with the provisional pressing plate by way of a member connected to the provisional pressing plate.

8. The press device according to claim 7, wherein the stopper is a wedge-shaped member which is inserted between a first wall of the fixed portion and the provisional pressing plate or a second wall of a member connected to the provisional pressing plate, and the wedge-shaped member has a stepped shape where a thickness of the wedge-shaped member differs depending on positions.

9. The press device according to claim 7, wherein the stopper is a wedge-shaped member which is inserted between a first wall of the fixed portion and the provisional pressing plate or a second wall of a member connected to the provisional pressing plate, and the wedge-shaped member has a tapered shape where a thickness of the wedge-shaped member changes continuously.

10. A press method for pressing a work using a press device which includes: a press head including: a press plate having a press surface which forms a work contact surface; a chamber base body disposed in a state where the chamber base body faces the press plate; and an elastic packing formed in a ring shape as viewed in a plan view and disposed between the press plate and the chamber base body;

a provisional pressing unit including: a provisional pressing plate configured to transmit a provisional pressing force in a provisional pressing direction which is a direction along which the work is disposed; and a provisional pressing force applying mechanism configured to give the provisional pressing force to the provisional pressing plate; and a suppression unit configured to suppress movement of the provisional pressing plate in a counter provisional pressing direction which is a direction opposite to the provisional pressing direction, wherein the chamber is formed of a space surrounded by an inner surface of the press plate, an inner surface of the chamber base body and the elastic packing, the press method comprising in a following order:

a provisional pressing unit advancing step of advancing the provisional pressing unit in the direction along which the work is disposed;

a provisional pressing step of provisionally pressing the work by further moving the provisional pressing unit in the direction along which the work is disposed, and of directly or indirectly deforming the elastic packing by compression;

a suppression unit activating step of activating the suppression unit while maintaining a state where the elastic packing is deformed by compression so as to restrict a displacement of the provisional pressing plate in the counter provisional pressing direction; and a main pressing step of generating a main pressing force on the work placed on the press surface by driving the press plate by introducing a pressurized fluid to an inside of the chamber from a pressurized fluid source.

11. The press method according to claim 10, wherein the provisional pressing force applying mechanism of the press device is disposed on a side opposite to a side where the work is disposed as viewed from the provisional pressing plate, and is configured to apply the provisional pressing force to the provisional pressing plate.

12. The press method according to claim 10, wherein the provisional pressing force applying mechanism of the press device is configured to give the provisional pressing force to the provisional pressing plate by pulling the provisional pressing plate.

13. A method of manufacturing a press product obtained by pressing a work using a press device which includes: a press head including: a press plate having a press surface which forms a work contact surface; a chamber base body disposed in a state where the chamber base body faces the press plate; and an elastic packing formed in a ring shape as viewed in a plan view and disposed between the press plate and the chamber base body;

a provisional pressing unit including: a provisional pressing plate configured to transmit a provisional pressing force in a provisional pressing direction which is a direction along which the work is disposed; and a provisional pressing force applying mechanism configured to give the provisional pressing force to the provisional pressing plate; and a suppression unit configured to suppress movement of the provisional pressing plate in a counter provisional pressing direction which is a direction opposite to the provisional pressing direction, wherein the chamber is formed of a space surrounded by an inner surface of the press plate, an inner surface of the chamber base body and the elastic packing, the method of manufacturing a press product comprising in a following order:

a provisional pressing unit advancing step of advancing the provisional pressing unit in the direction along which the work is disposed;

a provisional pressing step of provisionally pressing the work by further moving the provisional pressing unit in the direction along which the work is disposed, and of directly or indirectly deforming the elastic packing by compression;

a suppression unit activating step of activating the suppression unit while maintaining a state where the elastic packing is deformed by compression so as to restrict a displacement of the provisional pressing plate in the counter provisional pressing direction; and a main pressing step of generating a main pressing force on the work placed on the press surface by driving the press plate by introducing a pressurized fluid to an inside of the chamber from a pressurized fluid source.

14. The method of manufacturing a press product according to claim 13, wherein the provisional pressing force applying mechanism of the press device is disposed on a side opposite to a side where the work is disposed as viewed from the provisional pressing plate, and is configured to apply the provisional pressing force to the provisional pressing plate.

15. The method of manufacturing a press product according to claim 13, wherein the provisional pressing force applying mechanism of the press device is configured to give the provisional pressing force to the provisional pressing plate by pulling the provisional pressing plate.

* * * * *